United States Patent [19]

Schrott et al.

[11] Patent Number: 4,829,509
[45] Date of Patent: May 9, 1989

[54] OPTICAL RECORDING MEDIUM, ITS PREPARATION AND ITS USE AS A READ ONLY MEMORY INFORMATION CARRIER

[75] Inventors: Wolfgang Schrott, Ludwigshafen; Peter Neumann, Wiesloch; Peter Hauser, Limburgerhof; Gerhard Wagenblast, Frankenthal, all of Fed. Rep. of Germany

[73] Assignee: BASF Aktiengesellschaft, Ludwigshafen, Fed. Rep. of Germany

[21] Appl. No.: 942,371

[22] Filed: Dec. 16, 1986

[30] Foreign Application Priority Data

Jan. 15, 1986 [DE] Fed. Rep. of Germany ....... 3600902
Mar. 12, 1986 [DE] Fed. Rep. of Germany ....... 3608213

[51] Int. Cl.⁴ ............................ G11B 7/24; G11B 7/26
[52] U.S. Cl. .................................. 369/275; 346/135.1; 346/76 L; 369/288; 428/64; 428/65
[58] Field of Search ............... 369/275, 276, 284, 286, 369/288; 346/76 L, 135.1; 430/270, 321, 945; 428/64, 65, 408, 694, 695, 143

[56] References Cited

U.S. PATENT DOCUMENTS

| | | | |
|---|---|---|---|
| 3,404,061 | 10/1968 | Shane et al. | 428/143 |
| 3,656,175 | 4/1972 | Carlson et al. | 346/76 L |
| 3,954,469 | 5/1976 | Avanzado et al. | 369/275 |
| 4,245,003 | 1/1981 | Oransky et al. | 346/76 L |
| 4,363,844 | 12/1982 | Lewis et al. | 364/275 |
| 4,433,340 | 2/1984 | Mashita et al. | European |
| 4,470,053 | 9/1984 | Maffitt et al. | European |
| 4,588,674 | 5/1986 | Stewart et al. | 346/135.1 |
| 4,626,493 | 12/1986 | Butters et al. | 430/945 |

FOREIGN PATENT DOCUMENTS

5718031A 1982 Japan.
58185293A 1983 Japan.
59198546A 1984 Japan.
1316398 5/1973 United Kingdom.

OTHER PUBLICATIONS

Sigri Elektrographit GmbH, Graflex® flexibler Graphit (6 pages).
Kirk-Othmer, Encyclopedia of Chemical Technology, 3rd Ed., 1981, vol. 16, pp. 731 and 741.
Ullmanns Encyklopädie der technischen Chemie, 4th Ed., vol. 14, pp. 616, 617.
Patent Abstracts of Japan, Vol. 6, No. 82, (p-116) (960), 5-29-82, Abstract of 57-18031 (A)
*Patent Abstracts of Japan, Vol. 8, No. 28, (M-274) (1465), 2-7-84, Abstract of 58-185293(A)
*Patent Abstracts of Japan, Vol. 9, No. 64 (P-343), (1787), 3-23-85, Abstract of 59-198546 (A)

Primary Examiner—Alan Faber
Assistant Examiner—Hoa T. Nguyen
Attorney, Agent, or Firm—Oblon, Fisher, Spivak, McClelland & Maier

[57] ABSTRACT

An optical recording medium containing a storage layer and, if required, one or two substrate layers, the storage layer containing graphite as the storage material, a process for the production of the novel optical recording medium, and its use as a Read Only Memory information carrier.

12 Claims, 1 Drawing Sheet

OPTICAL RECORDING MEDIUM, ITS PREPARATION AND ITS USE AS A READ ONLY MEMORY INFORMATION CARRIER

The present invention relates to a novel optical recording medium containing graphite as the storage material, a process for its preparation and its use as a Read Only Memory information carrier.

BACKGROUND OF THE INVENTION

A large number of materials have been described as optical storage media for analog or digital storage of information with the aid of a laser beam. The information is written into the particular storage medium in the form of holes, pits or bubbles or by phase transformations or other local changes in properties. Storage media which have been described are thin layers of inorganic materials, such as metals, alloys, doped metals, metal oxides or metal sulfides, and of organic compounds, in particular dyes, but also liquid crystal compounds or polymers and combinations of these.

Dyes have a high absorption which can be optimized for the relevant laser wavelength, and are distinguished by low thermal conductivity and a variety of possible methods of processing, (eg. vaporization under reduced pressure, or spincoating with or without a binder or other additives). Their optical data (real and imaginary part of the refractive index $[n,k]\lambda$) are generally inadequate, so that a high quality memory can be obtained only with matched layer thicknesses or with an additional reflector layer. Moreover, only a few suitable IR dyes are known which absorb sufficiently in the near infrared region (750–900 nm), i.e. in the spectral range in which the technically advantageous semiconductor lasers of the GaAlAs type emit light, and which are used for writing on and reading optical recording media in a reasonable manner. Hence, optimization of such systems requires additives, such as carbon black or oxygen quenchers, which have a synergistic effect but also complicate the preparation of the storage layers.

Although thin metal layers, in particular tellurium and its alloys, and modified materials based on tellurium exhibit suitable optical data (adequate absorption and reflection) in a wide wavelength range, they have relatively high thermal conductivities and are generally very sensitive to corrosion.

It is an object of the present invention to provide a novel optical recording medium, starting from a material which has adequate reflection, is easy to process and has high stability under the conditions of use.

Graphite, which has a layer structure and hence possesses properties of organic and inorganic (metallic) materials, should constitute a suitable storage material.

DE-A-2 150 134 describes an optical recording medium which consists of a thin layer (about 0.5–1.0 μm) of carbon black particles in a polymeric binder, preferably plasticized nitrocellulose, on a heat-resistant substrate (glass). The layer material is selectively vaporized or burned away at the irradiated points by means of a laser beam, and in this way an image is produced.

However, we have found that binder-containing carbon black layers which have been sprayed on have only a low reflectivity owing to the surface roughness; hence, high quality storage media are obtained only with matched layer thicknesses coupled with complete removal of material, and the information density remains restricted (as a result of the large signal area and signal spacing).

SUMMARY OF THE INVENTION

We have found that the above stated object of the present invention is achieved by an optical recording medium containing a storage layer and, if required, one or two substrate layers, wherein the storage layer contains graphite as the storage material.

We have furthermore found that, using compressed graphite, it is possible to achieve dramatic improvements in quality, regardless of the layer thickness. Moreover, simple methods can be employed for the preparation of the storage layer.

Because of the high corrosion resistance (chemical stability) of graphite, its stability under conditions of use and its toxicological acceptability, the system is ideally suited to a wide range of applications in the data storage sector and for other recording media. Furthermore, graphite in the form of high quality films is particularly advantageous as a storage material because the surface quality results in high light reflectivity over a wide wavelength range. Consequently, the storage material is independent of the wavelength of the laser light used.

The novel optical recording medium is advantageously obtained if a blank having a diameter of from 10 to 30 cm is stamped out of a graphite film, and the said blank is then pressed under from 300 to 8,000, preferably from 500 to 5,000, in particular from 700 to 1,000, bar and, if required, then provided with one or two substrate layers in a further pressing process.

The novel process is advantageously carried out as follows: disks having a diameter of from 10 to 30 cm are pressed out from a prepressed film of graphite, and these disks are then pressed in a press tool. Commercial, prepressed films of graphite in pure or fiber-reinforced form (also see Ullmanns Encyklopädie der technischen Chemie, 4th edition, volume 14, page 616), as also used, for example, for the production of seals for chemical apparatuses, are advantageously employed. The pressing process is usually carried out at room temperature. The optimum pressure in each case depends on the type of film material used and on the area of the graphite disk. In the pressing process, the preoriented graphite domains (layer structures) are further oriented and the surface homogenized, a metallic gloss being produced. This layer itself can be written on by means of a laser beam. The properties of this memory are in general dependent only on the surface quality and not on the layer thickness.

For mechanical stabilization, this graphite layer may be provided with one or two substrate layers. These also afford mechanical protection to the surface and hence to the stored information.

Suitable substrate layers are all those materials (glass and polymer materials) which have adequate optical properties. Substrate layers made of polymer material are preferably used, those which essentially consist of polymethyl methacrylate or polycarbonate being particularly preferred.

In a second pressing process under similar compression conditions, the substrate layers, for example in the form of diskettes 0.2 cm thick, can be pressed onto the graphite layer. To achieve optimum adhesion of the substrate layer or layers to the graphite, it may be advantageous additionally to use an adhesive to bond the substrate layer or layers. Suitable adhesives in this context are the conventional materials, as described in, for example, Ullmanns Encyklopädie der technischen Chemie, 4th edition, volume 14, page 227 et seq.

It is also possible to use substrate layers which have been provided with grooves beforehand, in order to permit guidance over the tracks and rapid data access. Depending on the conditions under which the memory is produced, the grooves in the substrate may remain empty or may be filled with a material (eg. adhesive) having a high refractive index.

However, it is also possible to carry out a second pressing process in which substrate layers are not applied to the graphite storage material. In this case, instead, track information can be introduced onto the graphite layer in the second pressing process, by using a master. The substrate layers can then additionally be pressed on.

We have found, surprisingly, that the thermoconductivity of the storage layer ($\lambda > 200$ W/mK, in the layer direction), which has a high anisotropy coefficient (about 30) owing to the layer structure, does not have an adverse effect if exposure is carried out using relatively short laser pulses.

For archiving large amounts of data and information, there is a growing demand for systems which permit this to be done within a very small space and with a very short access time. The refinement of semiconductor laser technology has given rise to the development of optical storage media and of read and write apparatuses which are superior to the conventional magnetic media in many respects.

Optical storage media known in principle are readable media (Read Only Memories, ROM), media which can be written once and are readable (Write Once Read Many, WORM) and erasable media. However, they are very expensive to produce. This applies both to the production and purification of the storage materials used and to the production of the memory (thin film technology, e.g. sputtering, vaporization under reduced pressure or spin-coating with defined layer thicknesses). Moreover, many storage materials present problems with regard to long-term stability because they are sensitive to oxidation or morphologically unstable (recrystallization of amorphous layers).

In addition to tapes and cards, Compact Disc Read Only Memories (CD-ROM) are particularly suitable for the abovementioned archiving of documentation, since such memories are capable of storing a large amount of data and information within a very small space, and the said data and information can be called up as often as desired and in a short access time. Furthermore, they have good long-term stability.

Optical ROMs known to date consist of a substrate (polymer or glass with a photoresist layer) which contains the information and is provided with a thin metal layer (preferably aluminum), with the result that the scanning laser beam is reflected.

It is a further object of the present invention to provide a cheap storage medium in which the expensive reflector layer (vaporization under reduced pressure) can be dispensed with.

We have found that this object too is achieved, and that the novel optical recording medium can advantageously be used as a Read Only Memory information carrier, the latter advantageously being in the form of compact disks, cards or tapes. Compact disks and cards may be mentioned in particular.

ROM information carriers in the form of compact disks are obtained, for example, if the information to be stored is pressed into the graphite disks described above by means of a master. To protect the surfaces (information) and to impart mechanical stability, this graphite layer may, according to the invention, be provided with one or two substrate layers.

Furthermore, ROM information carriers in the form of a card (for example, measuring 8.5×5.4 cm) can be obtained in a similar manner.

Tapes having a graphite-containing layer can be produced, for example, in a manner similar to that used for tapes containing a magnetic pigment layer, with or without the addition of assistants, e.g. binders.

This very simple procedure gives a cheap storage medium which is mechanically, thermally and chemically very stable and furthermore can be read by means of laser beams in a wide wavelength range and having different light-energies.

FIG. 1 of the accompanying drawing is a cross sectional view of a disc 1 formed from a further pressed prepared film of graphite.

FIG. 2 is a cross sectional view of such a disc 1 sandwiched between two MMA diskettes 2 and 3.

DETAILED DESCRIPTION OF THE PREFERRED EMBODIMENT

Figure 1:
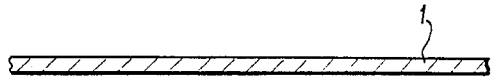
Figure 2:
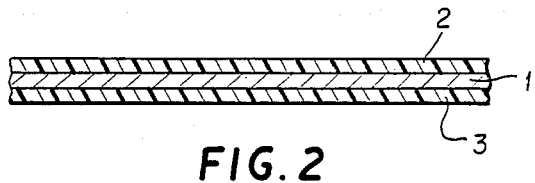

The Examples which follow illustrate the invention.

EXAMPLE 1

A graphite disk having a diameter of 10 cm was pressed under 750 bar in a press tool having a centered inner hole. The graphite layer thus obtained was readily removed from the press tool and exhited a pronounced metallic gloss. This layer had a reflectivity of from 30 to 35% over a wide wavelength range.

A binder-containing graphite layer sprayed onto glass served as the comparison. The reflectivity values of this layer were substantially poorer, both in the untreated state (rough surface) and after slight polishing (smooth surface).

Signals were written into the novel recording medium at various wavelengths by means of short light pulses, using a focussed laser beam. The magnitude of the signals was dependent on the energy density and could be controlled by means of the laser energy and focus or time. Signals are distinguished from the smooth (unwritten) environment because of the change in reflectivity. This differentiation takes the form of small depressions, due to local vaporization of graphite, or thermally induced roughening of the previously smooth graphite surface or a combination of the two effects. By exposure to a pulsed dye laser, it was possible to inscribe signals which were sufficiently large (diameter up to 0.3 mm) to permit contrast measurement using a microscope and spectrometer coupled by means of glass fibers. For reflection at 830 nm, the differences in the reflectivity of the signal (13%) and that of the environment (33%) gave a contrast of 20%.

EXAMPLE 2

A graphite storage layer was produced similarly to Example 1 and, in a second operation, pressed together with a polymethyl methacrylate (PMMA) diskette (thickness 1 mm, diameter 10 cm, centered inner hole of 15 mm diameter) in such a way that the substrate was not deformed. In order to join the two layers together in a stable manner, the outer and inner edges were adhesively bonded.

The storage layer could readily be written on from the free side (facing the air) and from the substrate side (facing PMMA). The contrast was the same on both sides, within the error limits, and the micrographs of the signals showed no significant differences. Measurement of the signal-to-noise ratio for a non-optimized storage layer of average quality gave a value which was 2.5 times that of a tellurium layer applied by vapor deposition.

EXAMPLE 3

Graphite storage layers were produced similarly to Example 1 and, in a second operation, adhesively bonded between two PMMA diskettes (cf. Example 2) and/or clamped with inner and outer retaining rings. This gave protected sandwich stores in which the two sides were identical. The recordability and quality were similar to those of the samples described in Examples 1 and 2, while the mechanical stability was substantially higher.

EXAMPLE 4

The graphite storage layer was produced similarly to Example 1 (diameter 13 cm) and, in a second operation similar to Example 3, adhesively bonded between two polycarbonate diskettes having a diameter of 13 cm and possessing grooves. The recordability and quality were similar to those of the above examples.

EXAMPLE 5

A graphite store was produced similarly to Example 4, except that the substrate used comprised two polycarbonate diskettes possessing grooves which had been filled with a binder-containing dye solution by spin-coating, the binder-containing dye layer having a substantially higher refractive index than the polycarbonate. The test results were similar to those obtained for a store described in Example 4.

EXAMPLE 6

A graphite layer was produced similarly to Example 1. In a second operation, vanadyl phthalocyanine was applied as a dye by vapor deposition, on one side in case (a) and on both sides in case (b). In a third step, the substrate (PMMA diskettes) was applied to each dye layer by a method similar to that described in Examples 3 to 5. In comparison with conventional storage media, in this system the graphite layer served as both absorber and reflector. Recordability at a laser wavelength matched with the absorption maximum of the dye was achieved at lower energy densities.

EXAMPLE 7

Disks having a diameter of 10 cm were punched out from a 0.2 mm thick graphite film. These blanks were pressed under 750 bar in a press tool having a centered inner hole. The graphite layer obtained in this manner was readily removed from the press tool and had a basic reflectivity of from 30 to 35% in the wavelength range from 500 to 1200 nm. This graphite disk was pressed together with a bottom die in an appropriate press tool, the information present on the bottom die being transferred to the graphite surface (in the form of depressions). The graphite disk (information carrier) was removed from the press tool and adhesively bonded between two 1.2 mm thick PMMA disks of 10 cm diameter under slight pressure (about 50 bar). The information was read from this store by means of a pulsed dye laser ($\lambda_W = 740$ nm). The contrast determined by means of a microscope coupled to a spectrometer (reflectivity [environment]-reflectivity [information]) was from 10 to 20%. The information was retained unchanged in all stability tests (exposure to heat, moisture and solvents), which the substrate withstood.

EXAMPLE 8

A graphite disk having a basic reflectivity of about 30% was produced from a 0.1 mm thick graphite film similarly to Example 7. This disk was placed in a press tool having 2 dies (bottom and cover) and pressed under about 1000 bar. The graphite disk containing information on both sides was further processed as described in Example 7 and exhibited the same properties while possessing twice the storage capacity.

EXAMPLE 9

A CD-ROM based on graphite was produced similarly to Example 8, but had a diameter of 13 cm and was mechanically protected by being adhesively bonded to two polycarbonate disks. The store exhibited the same properties as the systems described in Examples 7 and 8.

EXAMPLE 10

A CD-ROM produced similarly to Example 9 was read using an HeNe laser.

EXAMPLE 11

A CD-ROM produced similarly to Example 9 was read using a GaAlAs semiconductor laser. The wavelengths used were 780 nm and 830 nm.

EXAMPLE 12

A CD-ROM produced similarly to Example 9 was read using an Nd-YAG laser.

EXAMPLE 13

Example 7 was repeated, a card measuring 8.5×5.4 cm being used instead of a disk.

We claim:

1. An optical recording medium containing a storage layer wherein the storage layer is a self-supporting film of substantially pure or fiber reinforced graphite pressed under 500 to 5000 bar to produce a metallic gloss on said film and said pressed graphite film is the optically reflective layer of the optical recording medium.

2. An optical recording medium according to claim 1 wherein the storage layer contains signals written therein as depressions.

3. An optical recording medium according to claim 1 wherein the storage layer contains signals written therein as independent depressions on opposite sides thereof.

4. An optical recording medium comprising a storage layer and a transparent substrate layer pressed upon and adhering to the storage layer wherein the storage layer is a self-supporting film of substantially pure or fiber reinforced graphite pressed under 500 to 5000 bar to produce a metallic gloss on said graphite film and said graphite film is the optically reflective layer of the optical recording medium.

5. An optical recording medium as claimed in claim 4, wherein the substrate layer essentially consists of polymethyl methacrylate.

6. An optical recording medium as claimed in claim 4, wherein the substrate layer essentially consists of a polycarbonate.

7. An optical recording medium according to claim 4 wherein the storage layer contains signals written therein as depressions.

8. An optical recording medium according to claim 4 wherein the storage layer contains signals written therein as independent depressions on opposite sides written thereof.

9. A process for the production of an optical recording medium, wherein a blank having a diameter of from 10 to 30 cm is punched out from a graphite film and pressed under from 300 to 8000 bar.

10. The method of using an optical recording medium as a Read Only Memory information carrier wherein the optical recording medium contains as the storage layer thereof a self-supporting film of substantially pure or fiber reinforced graphite pressed under 500 to 5000 bar to produce a metallic gloss on said film and said pressed graphite film is the optically reflective layer of the optical recording medium and wherein the optically readable information has been pressed into the graphite film.

11. A process for the production of an optical recording medium, wherein a blank having a diameter of from 10 to 30 cm is punched out from a graphite film, pressed under from 300 to 8000 bar and, then provided with one or two substrate layers in a further pressing process.

12. A process as claimed in claim 11, wherein substrate layers already possessing grooves are used.

* * * * *